(12) United States Patent
Lin et al.

(10) Patent No.: US 12,471,102 B2
(45) Date of Patent: Nov. 11, 2025

(54) METHODS AND APPARATUS FOR UE POWER SAVINGS IN INITIAL DOWNLINK BANDWIDTH PART DEDICATED TO REDCAP DEVICES

(71) Applicant: Samsung Electronics Co., Ltd., Suwon-si (KR)

(72) Inventors: Qiongjie Lin, Sunnyvale, CA (US); Hongbo Si, Plano, TX (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 530 days.

(21) Appl. No.: 17/814,483

(22) Filed: Jul. 22, 2022

(65) Prior Publication Data

US 2023/0049735 A1 Feb. 16, 2023

Related U.S. Application Data

(60) Provisional application No. 63/277,940, filed on Nov. 10, 2021, provisional application No. 63/240,238, (Continued)

(51) Int. Cl.
  *H04W 72/23* (2023.01)
  *H04L 5/00* (2006.01)

(52) U.S. Cl.
  CPC ........... *H04W 72/23* (2023.01); *H04L 5/0053* (2013.01)

(58) Field of Classification Search
  None
  See application file for complete search history.

(56) References Cited

U.S. PATENT DOCUMENTS 11,818,699 B2 * 11/2023 Lee .................. H04W 72/0453
2019/0261244 A1 * 8/2019 Jung .................... H04L 5/0048
(Continued)

FOREIGN PATENT DOCUMENTS

WO   2020258216 A1   12/2020
WO   2021109915 A1   6/2021

OTHER PUBLICATIONS

International Search Report and Written Opinion issued Nov. 28, 2022 regarding International Application No. PCT/KR2022/012126, 6 pages.
(Continued)

*Primary Examiner* — Kodzovi Acolatse

(57) ABSTRACT

Methods and apparatuses for operating in different bandwidth parts (BWPs). A method includes receiving a first synchronization signal and physical broadcast channel (SS/PBCH) block in a first BWP; determining, based on information provided by the first SS/PBCH block, a first control resource set (CORESET) in the first BWP; and receiving a first physical downlink control channel (PDCCH) in the first CORESET. The PDCCH provides a first downlink control information (DCI) format that schedules a reception of a first physical downlink shared channel (PDSCH) providing a system information block (SIB1). The method further includes receiving the first PDSCH, determining a second BWP based on information provided by the SIB1, and receiving a second SS/PBCH block in the second BWP. The
(Continued)

second BWP does not include a bandwidth of the first SS/PBCH block. The second BWP does not include a bandwidth of the first CORESET.

15 Claims, 7 Drawing Sheets

Related U.S. Application Data filed on Sep. 2, 2021, provisional application No. 63/235,480, filed on Aug. 20, 2021, provisional application No. 63/232,457, filed on Aug. 12, 2021.

(56) References Cited

U.S. PATENT DOCUMENTS

| | | |
|---|---|---|
| 2020/0413335 A1 | 12/2020 | Lu et al. |
| 2021/0007066 A1 | 1/2021 | Lin et al. |
| 2021/0058971 A1* | 2/2021 | MolavianJazi ...... H04B 17/318 |
| 2021/0076384 A1 | 3/2021 | MolavianJazi et al. |
| 2021/0195654 A1 | 6/2021 | Lei et al. |
| 2022/0159492 A1* | 5/2022 | Wu ........................ H04W 48/16 |
| 2023/0209542 A1* | 6/2023 | Wang ................ H04W 74/0833 370/329 |
| 2023/0224880 A1* | 7/2023 | Xiong ................... H04L 5/0007 370/329 |
| 2023/0247614 A1* | 8/2023 | Li ......................... H04L 5/0012 370/329 |
| 2024/0040490 A1* | 2/2024 | Mu ......................... H04L 5/005 |
| 2024/0064721 A1* | 2/2024 | Lee ...................... H04L 5/0053 |
| 2024/0196413 A1* | 6/2024 | Chatterjee ......... H04W 74/0833 |

OTHER PUBLICATIONS

LG Electronics Inc., "Higher layer support for reduced capability NR devices", 3GPP TSG RAN WG1 Meeting ¥106-e, R1-2107451, Aug. 2021, 6 pages.

"3rd Generation Partnership Project; Technical Specification Group Radio Access Network; NR; Physical channels and modulation (Release 16)", 3GPP TS 38.211 V16.6.0, Jun. 2021, 134 pages.

"3rd Generation Partnership Project; Technical Specification Group Radio Access Network; NR; Multiplexing and channel coding (Release 16)", 3GPP TS 38.212 V16.6.0, Jun. 2021, 153 pages.

"3rd Generation Partnership Project; Technical Specification Group Radio Access Network; NR; Physical layer procedures for control (Release 16)", 3GPP TS 38.213 V16.6.0, Jun. 2021, 187 pages.

"3rd Generation Partnership Project; Technical Specification Group Radio Access Network; NR; Physical layer procedures for data (Release 16)", 3GPP TS 38.214 V16.6.0, Jun. 2021, 172 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.

Extended European Search Report issued Aug. 16, 2024 regarding Application No. 22856294.8, 8 pages.

Intel Corporation, "On reduced BW support for RedCap", 3GPP TSG RAN WG1, Meeting #106-E, R1-2107596, Aug. 2021, 16 pages.

* cited by examiner

METHODS AND APPARATUS FOR UE POWER SAVINGS IN INITIAL DOWNLINK BANDWIDTH PART DEDICATED TO REDCAP DEVICES

CROSS-REFERENCE TO RELATED APPLICATION AND CLAIM OF PRIORITY

This application claims priority under 35 U.S.C. § 119(e) to: U.S. Provisional Patent Application No. 63/232,457 filed on Aug. 12, 2021; U.S. Provisional Patent Application No. 63/235,480 filed on Aug. 20, 2021; U.S. Provisional Patent Application No. 63/240,238 filed on Sep. 2, 2021; and U.S. Provisional Patent Application No. 63/277,940 filed on Nov. 10, 2021. The above-identified provisional patent applications are hereby incorporated by reference in their entirety.

TECHNICAL FIELD

The present disclosure relates generally to wireless communication systems and, more specifically, the present disclosure relates to supporting UEs with reduced capabilities (RedCap UEs) by a network and, in particular, in supporting communication for RedCap UEs in an initial downlink (DL) bandwidth part (BWP) and in an initial uplink (UL) BWP that are dedicated to RedCap UEs.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to UE power savings in initial downlink bandwidth part dedicated to RedCap devices.

In one embodiment, a method for a user equipment (UE) to operate in different BWPs is provided. The method includes receiving a first synchronization signal and physical broadcast channel (SS/PBCH) block in a first BWP; determining, based on information provided by the first SS/PBCH block, a first control resource set (CORESET) in the first BWP; and receiving a first physical downlink control channel (PDCCH) in the first CORESET. The PDCCH provides a first downlink control information (DCI) format that schedules a reception of a first physical downlink shared channel (PDSCH) providing a system information block (SIB1). The method further includes receiving the first PDSCH, determining a second BWP based on information provided by the SIB1, and receiving a second SS/PBCH block in the second BWP. The second BWP does not include a bandwidth of the first SS/PBCH block. The second BWP does not include a bandwidth of the first CORESET.

In another embodiment, a user equipment (UE) is provided. The UE includes a transceiver configured to receive a first SS/PBCH block in a first BWP and a processor operably coupled to the transceiver. The processor is configured to determine, based on information provided by the first SS/PBCH block, a first CORESET in the first BWP. The transceiver is further configured to receive a first PDCCH in the first CORESET and a first PDSCH. The PDCCH provides a first DCI format that schedules a reception of the first PDSCH providing a SIB1. The processor is further configured to determine a second BWP based on information provided by the SIB1. The transceiver is further configured to receive a second SS/PBCH block in the second BWP. The second BWP does not include a bandwidth of the first SS/PBCH block. The second BWP does not include a bandwidth of the first CORESET.

In yet another embodiment, a base station is provided. The base station includes a transceiver configured to transmit a first SS/PBCH block in a first BWP and a processor operably coupled to the transceiver. The processor is configured to determine, based on information provided by the first SS/PBCH block, a first CORESET in the first BWP. The transceiver is further configured to transmit a first PDCCH in the first CORESET and a first PDSCH. The PDCCH provides a first DCI format that schedules the first PDSCH reception providing a SIB1. The processor is further configured to determine a second BWP based on information provided by the SIB1. The transceiver is further configured to transmit a second SS/PBCH block in the second BWP. The second BWP does not include a bandwidth of the first SS/PBCH block. The second BWP does not include a bandwidth of the first CORESET.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
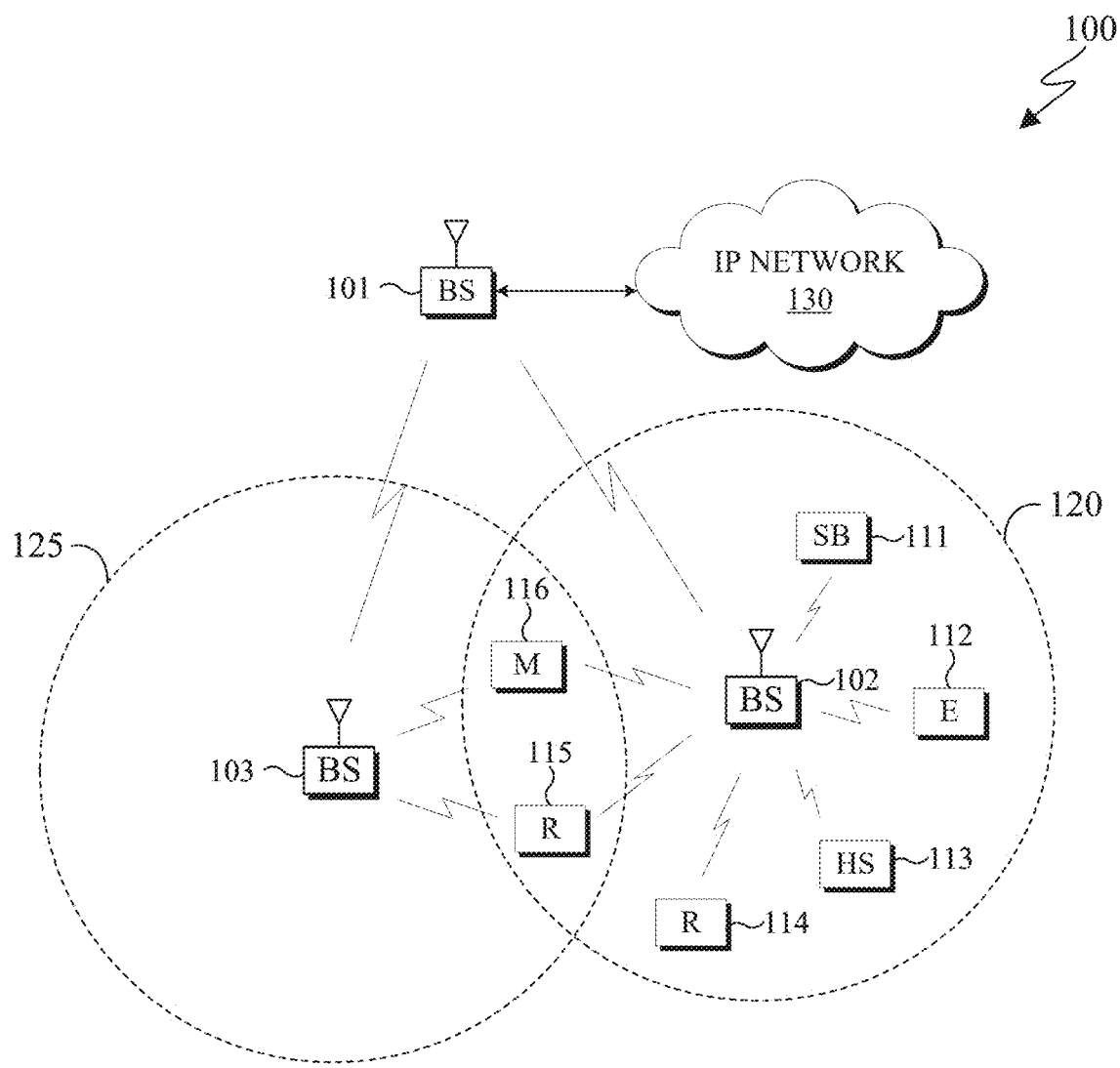
FIG. 1 illustrates an example wireless network according to embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.6.0, "NR; Physical channels and modulation" ("REF1"); 3GPP TS 38.212 v16.6.0, "NR; Multiplexing and channel coding" ("REF2"); 3GPP TS 38.213 v16.6.0, "NR; Physical layer procedures for control" ("REF3"); 3GPP TS 38.214 v16.6.0, "NR; Physical layer procedures for data" ("REF4"); 3GPP TS 38.331 v16.5.0, "NR; Radio Resource Control (RRC) protocol specification" ("REF5"); and 3GPP TS 38.321 v16.5.0, "NR; Medium Access Control (MAC).protocol specification" ("REF6").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance.

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long-term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Aspects of the present disclosure may be applied to deployment of 5G communication systems, 6G or even later releases which may use THz bands. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS', 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
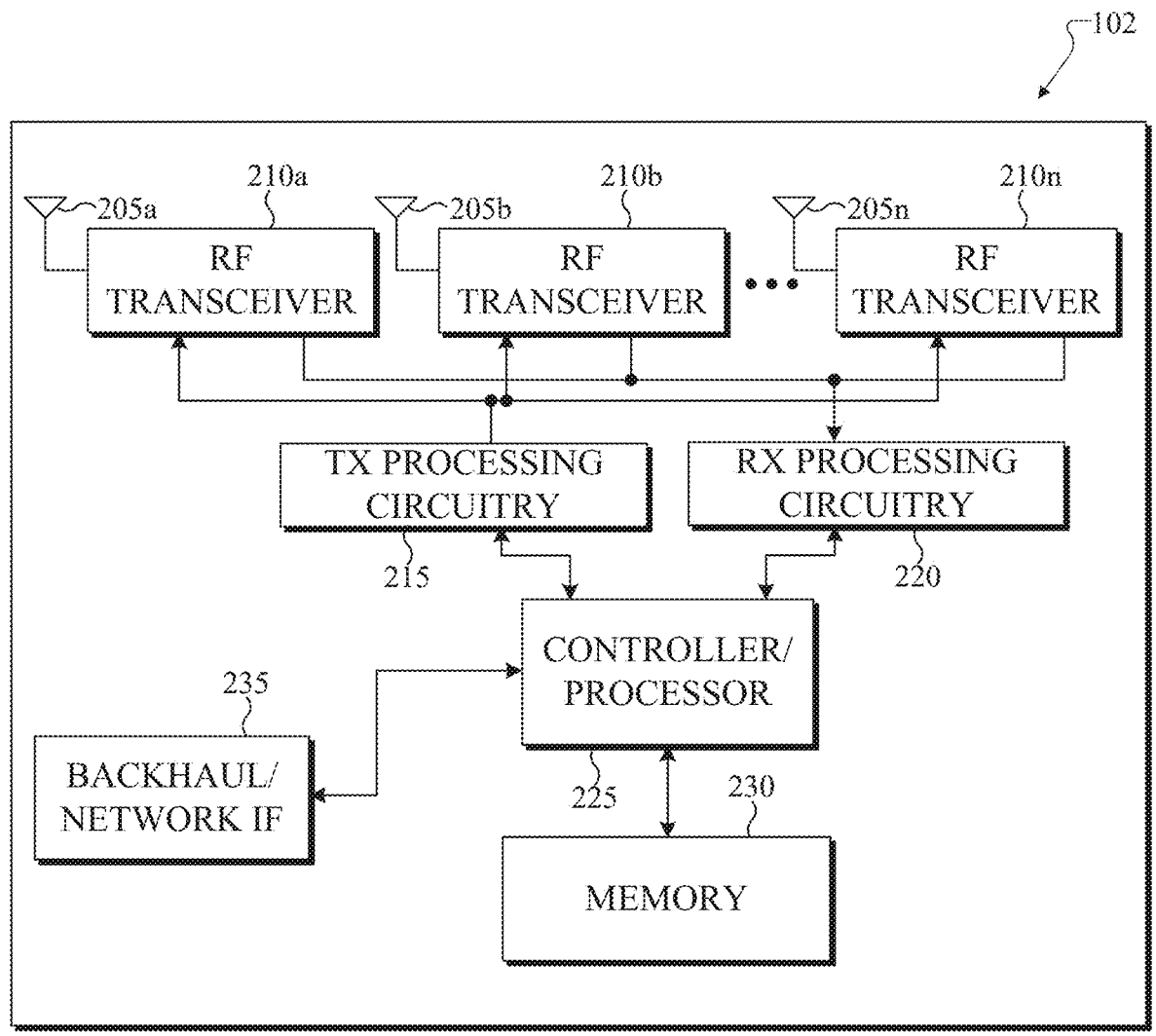
FIG. 2 illustrates an example base station (BS) according to embodiments of the present disclosure.
Figure 3:
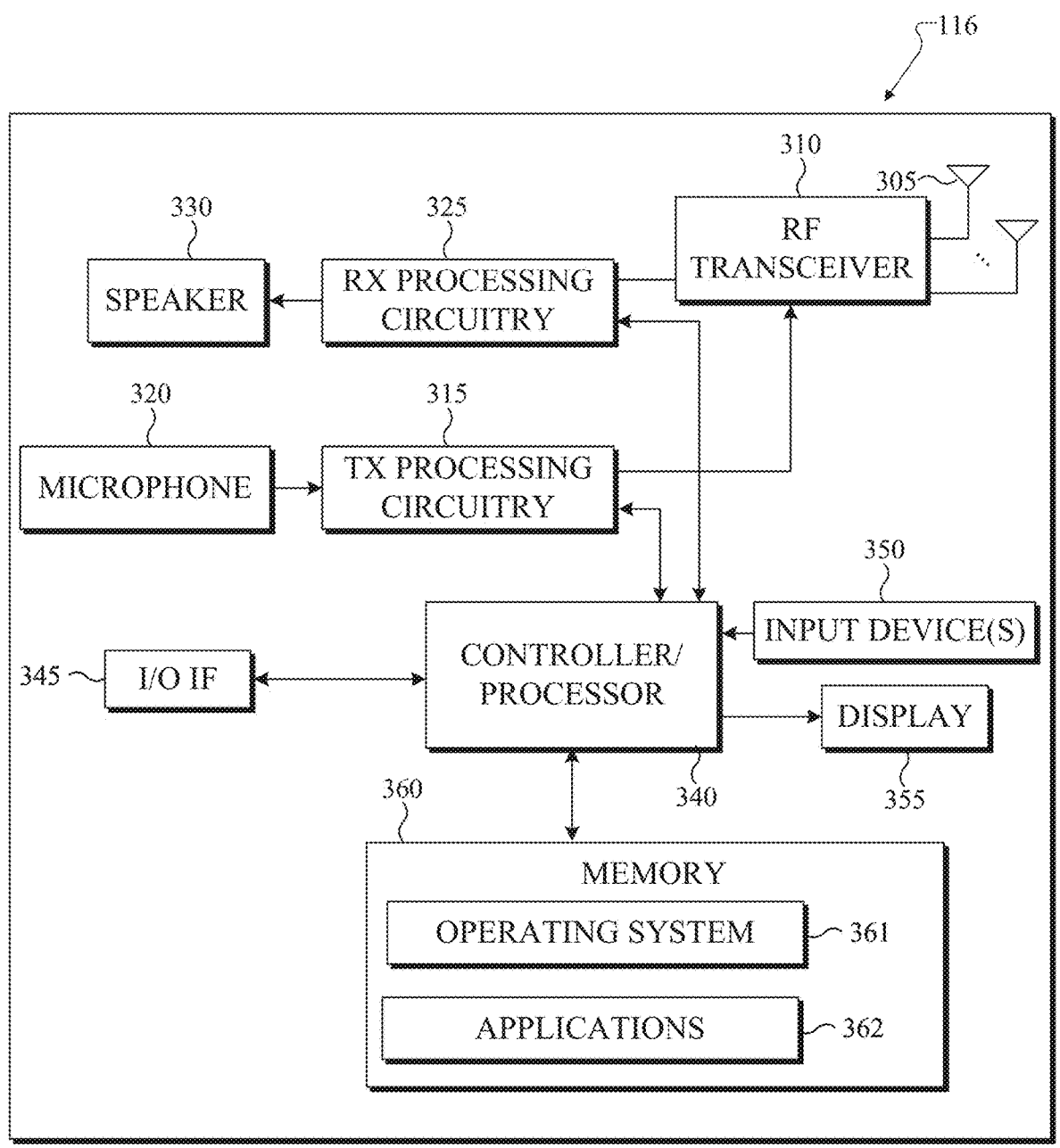
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., such as a gNodeB (gNB)), a BS 102 (e.g., such as a gNG), and a BS 103 (e.g., such as a gNG). The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for UE power savings in initial downlink (DL) BWP part dedicated to RedCap devices. In certain embodiments, and one or more of the BSs 101-103 includes circuitry, programing, or a combination thereof for UE power savings in initial DL BWP dedicated to RedCap devices.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support UE power savings in initial DL BWP dedicated to RedCap devices. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
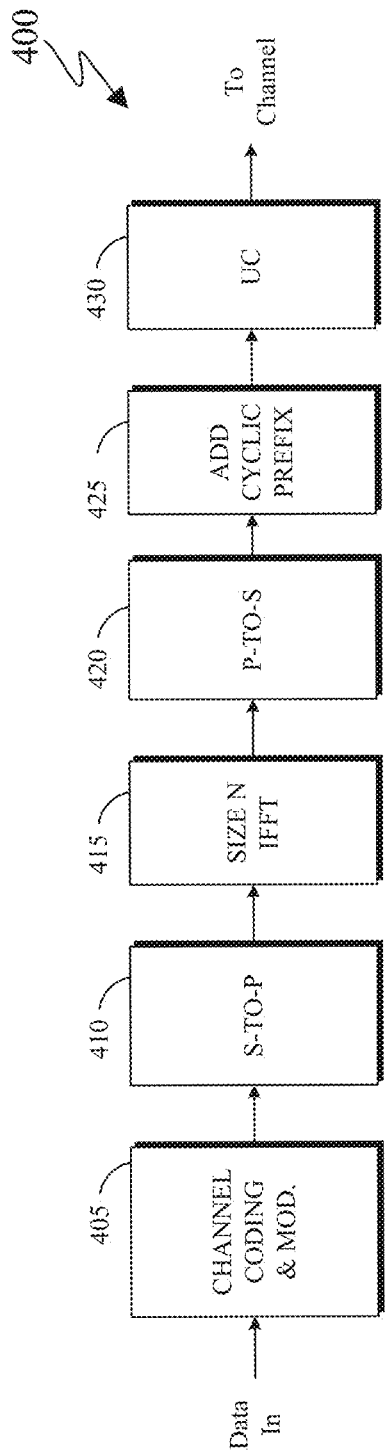
FIGS. 4 and 5 illustrate example wireless transmit and receive paths according to embodiments of the present disclosure.
Figure 5:
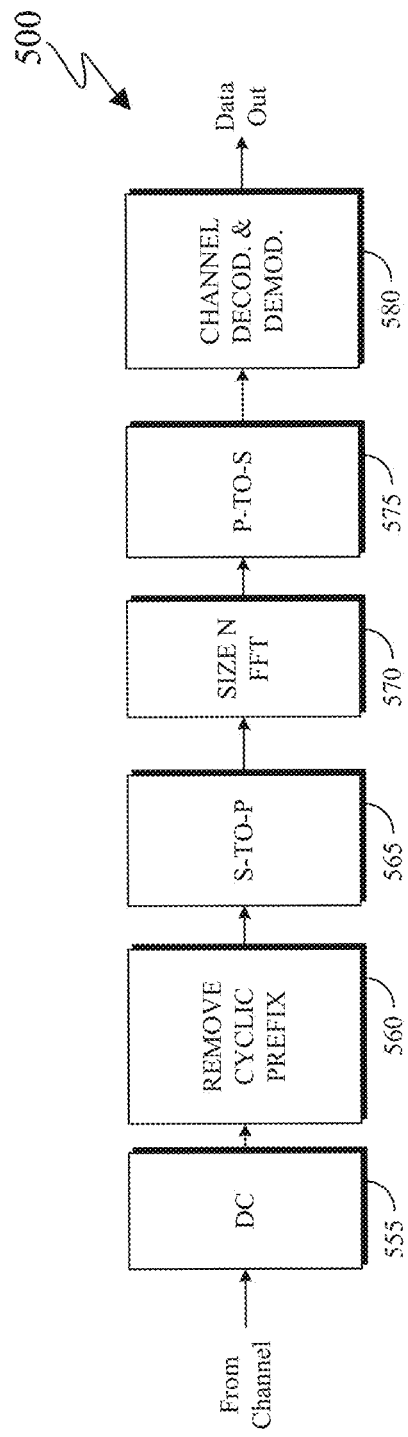

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support UE power savings in initial DL BWP dedicated to RedCap devices as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

NR Rel-17 supports reduced capability (RedCap) NR devices/UEs. A RedCap UE supports a reduced maximum operating bandwidth (BW), such as 20 MHz or less, relative to conventional/legacy UEs that support a larger operating BW such as 100 MHz. To avoid congestion during initial access, a serving gNB can configure a second initial UL/DL BWP (iBWP) to RedCap UEs (also referred as dedicated UL/DL iBWP or as UL/DL iBWP-light in this disclosure), in addition to an initial UL/DL BWP configured for legacy UEs (also referred as primary UL/DL iBWP in this disclosure). A RedCap UE can perform transmissions or receptions for a random access (RA) procedure and/or paging reception in the dedicated UL iBWP or DL iBWP (e.g. the second iBWP), respectively, to minimize an impact to legacy UEs in the primary initial UL BWP or DL BWP that includes CORESET #0 provided by the cell-defining synchronization signal and primary broadcast channel (SS/PBCH) block, or SSB for brevity.

In addition to receptions associated with a random access procedure, such as for a random access response (RAR), it is beneficial to consider reception of other system information (OSI) or of paging in the dedicated iBWP so that a RedCap UE can reduce power consumption and avoid communication delays by avoiding frequency hopping or BWP switching for RAR reception, OSI, or paging reception in the primary DL iBWP or for transmissions after the random access procedure in the primary UL iBWP. OSI refers to system information other than the one provided by the master information block (MIB) or the first system information block (SIB1). In the following, when not explicitly noted, a BWP associated with receptions by a RedCap UE is a DL BWP and a BWP associated with transmissions from a RedCap UE is an UL BWP.

Based on NR Rel-15/16 specifications, a UE (such as the UE 116) can perform measurements on a serving cell based on the cell-defining SSB that the UE detected during initial access in the primary initial BWP. The serving gNB can further configure the UE to perform intra-frequency/inter-frequency/inter-RAT RRM measurements in the RRC_IDLE/INACTIVE state. For a RedCap UE in a dedicated iBWP, the RedCap UE may need to switch between the dedicated iBWP and the primary iBWP for RS reception on the serving cells or for RRM measurements.

Accordingly, embodiments of the present disclosure take into consideration that there is a need to support OSI reception by RedCap UEs in a dedicated initial BWP. Embodiments of the present disclosure also take into consideration that there is a need to support RRM measurements by RedCap UEs in a dedicated initial BWP. Embodiments of the present disclosure further take into consideration that there is a need to support cell-specific RS resources for RedCap UEs in a dedicated initial BWP. Additionally, embodiments of the present disclosure further take into consideration that there is a need to support SSB receptions by RedCap UEs within the BW of an initial DL BWP indicated for RedCap UEs.

Embodiments of the present disclosure relate to determining OSI reception for RedCap UEs in a dedicated initial DL BWP. This is described in the following examples and embodiments, such as those of FIG. 6. Embodiments of the present disclosure also relate to performing RRM measurements by RedCap UEs in a dedicated initial DL BWP. Embodiments of the present disclosure further relate to indicating RS resources for RedCap UEs in a dedicated initial BWP. Additionally, embodiments of the present disclosure relate to restrictions of SSBs in a separate initial DL BWP indicated for RedCap UEs.

The following embodiments of the present disclosure describe OSI reception in dedicated iBWP. This is described in the following examples and embodiments, such as those of FIG. 6.

Figure 6:
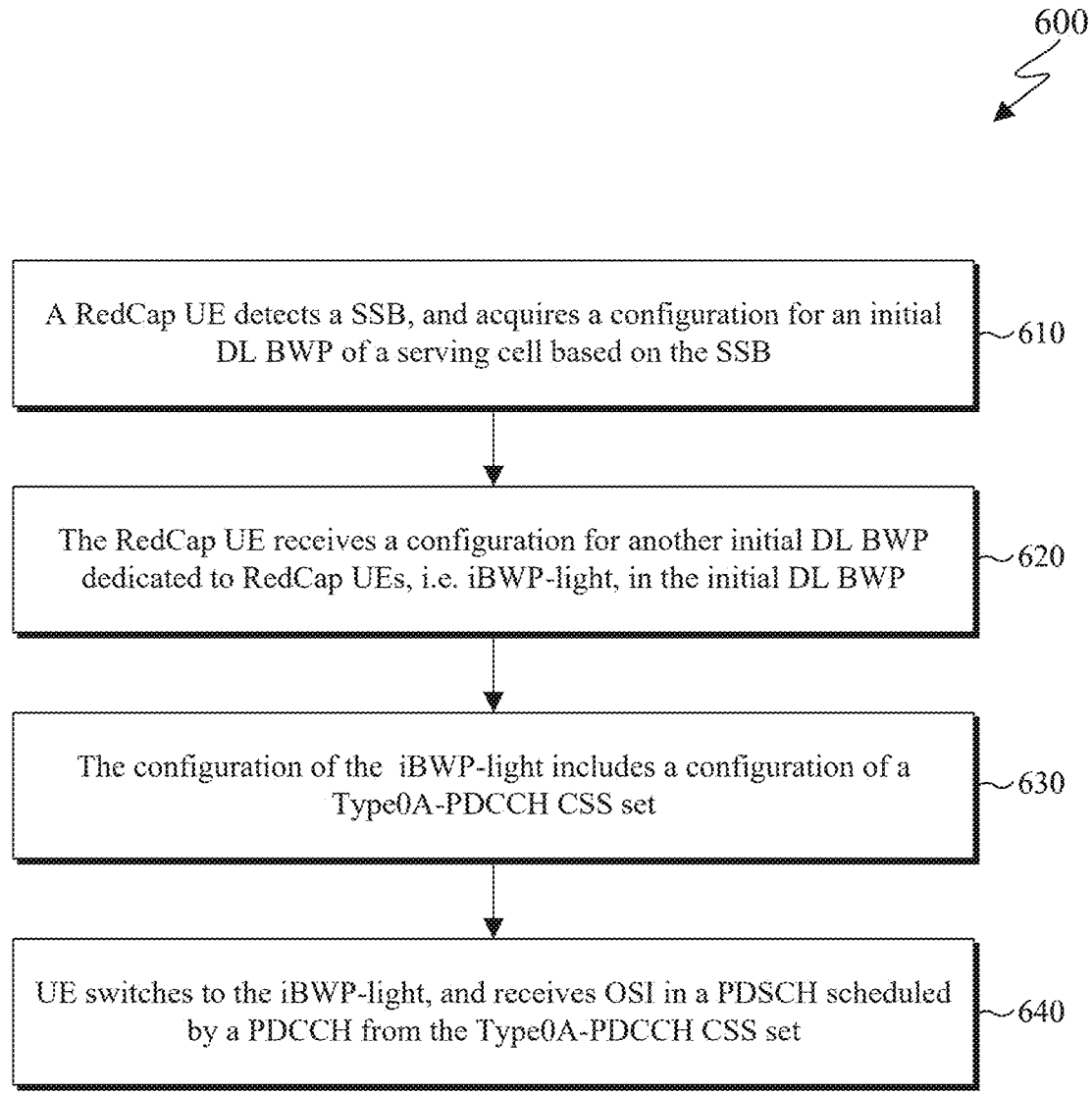
FIG. 6 illustrates an example method of a UE procedure for other system information (OSI) reception in an initial BWP dedicated to RedCap UEs according to embodiments of the present disclosure.

FIG. 6 illustrates an example method 600 of a UE procedure for OSI reception in an initial BWP dedicated to RedCap UEs according to embodiments of the present disclosure. The steps of the method 600 of FIG. 6 can be performed by any of the UEs 111-116 of FIG. 1, such as the UE 116 of FIG. 3. The method 600 is for illustration only and other embodiments can be used without departing from the scope of the present disclosure.

In certain embodiments, OSI reception by a RedCap UE in a dedicated initial DL BWP is described. The initial DL BWP dedicated to the RedCap UE is also referred to as DL iBWP-light or as iBWP-light in this disclosure.

The method 600, as illustrated in FIG. 6 describes an example of UE procedure for OSI reception in an initial BWP dedicated to RedCap UEs.

During an initial access process, a RedCap UE (such as the UE 116) in step 610 detects at least one SSB and acquires information for a configuration of an initial DL BWP of a serving cell based on a detected SSB. In step 620, the RedCap UE starts receiving in the initial DL BWP. The RedCap UE further receives information for a configuration of another initial DL BWP dedicated to the RedCap UE, i.e., iBWP-light. The information for the configuration of the iBWP-light can be included in remaining minimum system information (RMSI), i.e. SIB1, of the serving cell, and be received by the RedCap UE in a physical downlink shared channel (PDSCH) scheduled by a physical downlink control channel (PDCCH) that is received according to a Type0-PDCCH common search space (CSS) set in the initial DL BWP. In step 630, the RedCap UE obtains information for a configuration of a Type0A-PDCCH CSS set from the configuration of the iBWP-light. In step 640, the RedCap UE switches an active DL BWP to the iBWP-light and receives other system information (OSI), e.g. SIB-X, in a PDSCH scheduled by a PDCCH from the Type0A-PDCCH CSS set. The Type0A-PDCCH CSS set is associated with a CORESET within the iBWP-light.

In certain embodiments, in addition to the information for the configuration of Type0A-PDCCH CSS set, the configuration of iBWP-light can include at least one of the following information for configuring RedCap UE operation within the iBWP-light in a serving cell (for transmissions, the UL iBWP-light applies; for receptions, the DL iBWP-light applies).

For example, the information for configuring RedCap UE operation within the iBWP-light in a serving cell can include a configuration of physical random access channel (PRACH) preambles and/or RACH occasions.

For another example, the information for configuring RedCap UE operation within the iBWP-light in a serving cell can include ra-SearchSpace providing information for a configuration of a common search space set, i.e. Type1-PDCCH CSS set, for PDCCH receptions providing a downlink control information (DCI) format with cyclic redundancy check (CRC) scrambled by a radio access (RA) radio network temporary identifier (RNTI), a MsgB-RNTI, or a temporary cell RNTI (TC-RNTI). A RedCap UE can receive a PDCCH that provides the DCI format scheduling a PDSCH reception that includes a RAR (Msg2, MsgB), or Msg4 for a random access process.

For another example, the information for configuring RedCap UE operation within the iBWP-light in a serving cell can include pagingSearchSpace providing information for a configuration of a search space set, i.e., a Type2-PDCCH CSS set, for PDCCH receptions providing a DCI format with CRC bits scrambled by a paging RNTI (P-RNTI) scheduling a PDSCH providing paging information.

For another example, the information for configuring RedCap UE operation within the iBWP-light in a serving cell can include a configuration of physical layer signal/channel for providing paging early indication (PEI), such that the PEI indicates to the RedCap UE whether or not to monitor/receive PDCCH in next one or more paging occasions. In one example, the physical layer signal/channel can be a PDCCH. In another example, the physical layer signal/channel can be a RS resource, e.g., a tracking reference signal (TRS)/channel state information reference signal (CSI-RS) resource.

For another example, the information for configuring RedCap UE operation within the iBWP-light in a serving cell can include a Type3-PDCCH CSS set configured by SearchSpace in PDCCH-Config with searchSpaceType='common' for PDCCH receptions providing DCI formats with CRC scrambled by interruption RNTI (INT-RNTI), slot format indication RNTI (SFI-RNTI), transmit power control (TPC) physical uplink shared channel (PUSCH) RNTI (TPC-PUSCH-RNTI), TPC physical uplink control channel (PUCCH) RNTI (TPC-PUCCH-RNTI), transmit power control sounding reference signal (TPC-SRS-RNTI), or cancelation indication RNTI (CI-RNTI) and, only for the primary cell, cell-RNTI (C-RNTI), modulation and coding scheme cell RNTI (MCS-C-RNTI), configured scheduling RNTI (CS-RNTI(s)), or power savings RNTI (PS-RNTI).

For another example, the information for configuring RedCap UE operation within the iBWP-light in a serving cell can include a UE-specific search space (USS) set indicated by SearchSpace in PDCCH-Config with searchSpaceType='ue-Specific' for PDCCH receptions providing DCI formats with CRC scrambled by C-RNTI, MCS-C-RNTI, semi-persistent channel state information (CSI) RNTI (SP-CSI-RNTI), CS-RNTI(s), sidelink (SL-RNTI), sidelink configured scheduling RNTI (SL-CS-RNTI), or sidelink (SL) Semi-Persistent Scheduling vehicle to anything RNTI (V-RNTI).

For another example, the information for configuring RedCap UE operation within the iBWP-light in a serving cell can include an indication of one or more CORESETs.

For another example, the information for configuring RedCap UE operation within the iBWP-light in a serving cell can include an indication of one or more SSBs for transmission on the serving cell, wherein the indication may include at least one of (i) a physical cell ID, (ii) a frequency location of the one or more SSBs, and (iii) a bitmap indicating the transmission of the one or more SSBs.

For another example, the information for configuring RedCap UE operation within the iBWP-light in a serving cell can include at least an indication of one or more SSBs for measurements, wherein the indication may include at least one of (i) a physical cell ID, (ii) a frequency location of the one or more SSBs, and (iii) a bitmap indicating SSBs to be measured, (iv) a SSB-based RRM Measurement Timing Configuration (SMTC). A RedCap UE can receive SSBs from the one or more SSBs to measure reference signal received power (RSRP) (i.e., SS-RSRP), reference signal received quality (RSRQ) (i.e., SS-RSRQ), or signal to interference and noise ratio (SINR) (i.e., SS-SINR).

For another example, the information for configuring RedCap UE operation within the iBWP-light in a serving cell can include one or more sets of CSI-RS/TRS resources, where each CSI-RS/TRS resource from the sets of CSI-RS/TRS resources provides a cell ID of the serving cell. A RedCap UE can receive the CSI-RS/TRS resources to measure RSRP (i.e., CSI-RSRP), RSRQ (i.e., CSI-RSRQ), or SINR (i.e., CSI-SINR), of the serving cell.

For another example, the information for configuring RedCap UE operation within the iBWP-light in a serving cell can include a configuration for a reference signal strength indicator (RSSI) measurement.

For yet another example, the information for configuring RedCap UE operation within the iBWP-light in a serving cell can include a measurement object, e.g., MeasObjectNR in REF5, that provides information applicable for SSBs intra/inter-frequency measurements and/or CSI-RS intra/inter-frequency measurement. The RedCap UE performs RRM measurements for both serving cells and neighboring cells in the RRC_IDLE/INACTIVE state according to the measurement object.

In certain embodiments, the content of OSI received in a PDSCH scheduled by a DCI format provided by PDCCH according to the Type0A-PDCCH CSS set in iBWP-light can include at least one of the following information for configuring RedCap UE operation within the iBWP-light in a serving cell (for transmissions, the UL iBWP-light applies; for receptions, the DL iBWP-light applies).

For example, the content of OSI can include an indication of PRACH preambles and/or RACH occasions.

For another example, the content of OSI can include ra-SearchSpace providing a common search space set, i.e. a Type1-PDCCH CSS set, for PDCCH receptions providing a DCI format with CRC scrambled by a random access RNTI (RA-RNTI), a MsgB-RNTI, or a TC-RNTI. A RedCap UE can receive a PDCCH to schedule a PDSCH that includes RAR (Msg2, MsgB) or Msg4 for random access process.

For another example, the content of OSI can include pagingSearchSpace providing a common search space set, i.e. a Type2-PDCCH CSS set, for PDCCH receptions providing a DCI format with CRC scrambled by a P-RNTI.

For another example, the content of OSI can include a configuration of a physical layer signal/channel for providing a paging early indication (PEI) where the PEI indicates to a RedCap UE whether or not to monitor/receive PDCCH in next one or more paging occasions. In one example, the physical layer signal/channel can be a PDCCH. In another example, the physical layer signal/channel can be a RS resource, e.g., a TRS/CSI-RS resource.

For another example, the content of OSI can include a Type3-PDCCH CSS set provided by SearchSpace in PDCCH-Config with searchSpaceType='common' for PDCCH receptions providing DCI formats with CRC scrambled by INT-RNTI, SFI-RNTI, TPC-PUSCH-RNTI, TPC-PUCCH-RNTI, TPC-SRS-RNTI, or CI-RNTI and, only for the primary cell, C-RNTI, MCS-C-RNTI, CS-RNTI (s), or PS-RNTI.

For another example, the content of OSI can include a USS set provided by SearchSpace in PDCCH-Config with searchSpaceType='ue-Specific' for PDCCH receptions providing DCI formats with CRC scrambled by C-RNTI, MCS-C-RNTI, SP-CSI-RNTI, CS-RNTI(s), SL-RNTI, SL-CS-RNTI, or SL Semi-Persistent Scheduling V-RNTI.

For another example, the content of OSI can include an indication of one or more CORESETs.

For another example, the content of OSI can include an indication of one or more SSBs for transmission on the serving cell, wherein the configuration may include at least one of (i) a physical cell ID, (ii) a frequency location of the one or more SSBs, and (iii) a bitmap indicating the transmission of the one or more SSBs.

For another example, the content of OSI can include an indication of one or more SSBs for measurement, wherein the indication may include at least one of (i) a physical cell ID, (ii) a frequency location of the one or more SSBs, (iii) a bitmap indicating SSBs to be measured, and (iv) a SMTC. A RedCap UE can receive SSBs, from the one or more SSBs, to measure RSRP (i.e., SS-RSRP), RSRQ (i.e., SS-RSRQ), or SINR (i.e., SS-SINR).

For another example, the content of OSI can include one or more sets of CSI-RS/TRS resources, where each CSI-RS/TRS resource from the sets of CSI-RS/TRS resources provides a cell ID of the serving cell. A RedCap UE can receive the CSI-RS/TRS resources to measure RSRP (i.e., CSI-RSRP), RSRQ (i.e., CSI-RSRQ), or SINR (i.e., CSI-SINR), of the serving cell.

For another example, the content of OSI can include information for a RSSI measurement.

For yet another example, the content of OSI can include a measurement object, e.g., MeasObjectNR in REF5, to provide information applicable for SSBs intra/inter-frequency measurements and/or CSI-RS intra/inter-frequency measurement. A RedCap UE performs RRM measurements for both serving cells and neighboring cells in the RRC_IDLE/INACTIVE state according to the measurement object.

In certain embodiments a RedCap UE does not expect to be provided CORESET #0 or CSS set associated with CORESET #0 in the dedicated initial DL BWP.

In certain embodiments a RedCap UE does not expect to be provided Type0-PDCCH CSS set in the dedicated initial DL BWP.

In certain embodiments a RedCap UE does not expect to be provided SSBs for serving cell RRM measurement in the dedicated initial DL BWP.

Although FIG. 6 illustrates the method 600 various changes may be made to FIG. 6. For example, while the method 600 is shown as a series of steps, various steps could overlap, occur in parallel, occur in a different order, or occur multiple times. In another example, steps may be omitted or replaced by other steps. For example, steps of the method 600 can be executed in a different order.

The following embodiments of the present disclosure describe dedicated RRM measurement configuration for a RedCap UE. This is described in the following examples and embodiments, such as those of FIG. 7.

Figure 7:
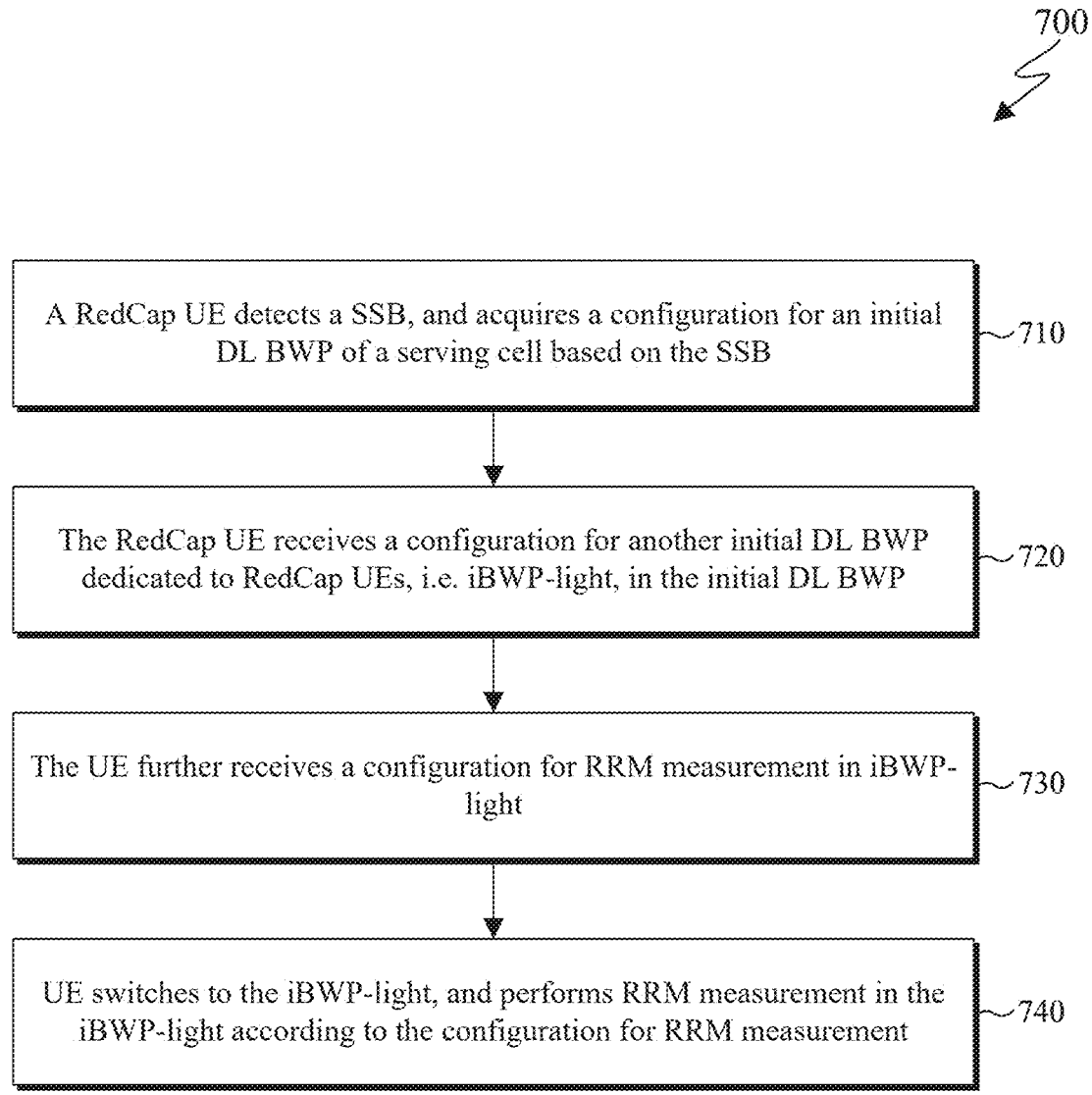
FIG. 7 illustrates an example method of a UE procedure for radio resource management (RRM) measurement based on dedicated RRM measurement configuration for RedCap UEs in the RRC_IDLE/INACTIVE state according to embodiments of the present disclosure.

FIG. 7 illustrates an example method 700 of a procedure for RRM measurements based on a dedicated configuration for RRM measurements by RedCap UEs in the RRC_IDLE/INACTIVE state according to embodiments of the present disclosure. The steps of the method 700 of FIG. 7 can be performed by any of the UEs 111-116 of FIG. 1, such as the UE 116 of FIG. 3. The method 700 is for illustration only and other embodiments can be used without departing from the scope of the present disclosure.

Embodiments of the present disclosure consider configuration of intra-frequency, inter-frequency or inter-RAT RRM measurements dedicated to a RedCap UE. Here the configuration is received by the RedCap UE in an initial DL BWP associated with CORESET #0. RedCap UEs can coexist within legacy UEs, i.e., UEs without reduced capabilities, in the initial DL BWP.

The method 700, as illustrated in FIG. 7 describes an example of UE procedure for RRM measurement based on dedicated RRM measurement configuration for RedCap UEs in the RRC_IDLE/INACTIVE state.

During initial access process, a RedCap UE (such as the UE 116) detects (in step 710) at least one SSBs and acquires information for an initial DL BWP of a serving cell based on the detected SSBs. In step 720, the RedCap UE starts receiving in the initial DL BWP. The RedCap UE further receives information for another initial DL BWP dedicated to the RedCap UE, i.e. iBWP-light. The information for the iBWP-light can be included in remaining system information (RMSI), i.e. SIB1, of the serving cell and can be received by the RedCap UE in a PDSCH scheduled by a DCI format provided in a PDCCH reception according to a Type0-PDCCH CSS set in the initial DL BWP. In step 730, the RedCap UE further receives information for RRM measurements in the iBWP-light. In step 740, the RedCap UE switches an active DL BWP from the initial DP BWP to the iBWP-light and performs RRM measurements in the iBWP-light according to the configuration for RRM measurements.

For obtaining the configuration of RRM measurements in iBWP-light, one of the following two methods can be considered.

In one method, a serving gNB (such as the BS 102) can provide to a RedCap UE information for the configuration of RRM measurements in iBWP-light together with the information for the configuration of iBWP-light. For example, both configurations are provided by RMSI. The RMSI can be dedicated to RedCap UEs. Alternatively, the RMSI can be common to both RedCap UEs and legacy UEs.

In another method, a serving gNB can provide to a RedCap UE the information for the configuration of RRM measurements in iBWP-light by a SIB, e.g., SIB-X, where X>1 is an integer, received by RedCap UE in a PDSCH scheduled by a DCI format in a PDCCH reception according to a Type0-PDCCH CSS set associated with CORESET #0 in the initial DL BWP.

A RedCap UE determines that a configuration for RRM measurements provides information applicable for SSBs intra/inter-frequency measurements and/or CSI-RS intra/inter-frequency measurements in iBWP-light. The RedCap UE performs RRM measurements in the iBWP-light for both serving cells and neighboring cells in the RRC_IDLE/INACTIVE state according to the measurement object. The information for the configuration for RRM measurements in iBWP-light can include any of the information included in MeasObjectNR in REF 5. For example, the information can include referenceSignalConfig to provide CSI-RS resources to be used for CSI-RS based RRM measurements and/or SSB configuration for mobility (nominal SSBs, timing configuration, and so on).

The information for the configuration of iBWP-light can include any of the following information for configuring RedCap UE operation within the iBWP-light in a serving cell.

For example, the information for configuring RedCap UE operation within the iBWP-light in a serving cell can include PRACH preambles or RACH occasions.

For another example, the information for configuring RedCap UE operation within the iBWP-light in a serving cell can include a CSS set for receiving PDCCHs providing DCI formats with CRC scrambled by RA-RNTI or TC-RNTI, wherein the DCI formats can schedule a PDSCH that includes RAR (Msg2, MsgB), or Msg4 for a random access process or a Msg3 PUSCH (re)transmission for the random access process.

For another example, the information for configuring RedCap UE operation within the iBWP-light in a serving cell can include a CSS set for paging reception, wherein a RedCap UE monitors PDCCH for detection of a DCI format with CRC scrambled by P-RNTI according to the CSS set.

For another example, the information for configuring RedCap UE operation within the iBWP-light in a serving cell can include a physical layer signal/channel for providing PEI, such that the PEI indicates the RedCap UE whether or not to monitor/receive PDCCH in next one or more paging occasions. In one example, the physical layer signal/channel can be a PDCCH. In another example, the physical layer signal/channel can be a RS resource, e.g., a TRS/CSI-RS resource.

For another example, the information for configuring RedCap UE operation within the iBWP-light in a serving cell can include information for one or more CORESETs.

For another example, the information for configuring RedCap UE operation within the iBWP-light in a serving cell can include a Type0A-PDCCH CSS set for PDCCH receptions providing a DCI format with CRC scrambled by a SI-RNTI.

For another example, the information for configuring RedCap UE operation within the iBWP-light in a serving cell can include an indication for one or more SSBs for measurement, wherein the indication can include at least one of (i) a physical cell ID, (ii) a frequency location of the one or more SSBs, (iii) a bitmap indicating SSBs to be measured, and (iv) a SMTC. A RedCap UE can receive SSBs from the one or more SSBs to measure RSRP (i.e., SS-RSRP), RSRQ (i.e., SS-RSRQ), or SINR (i.e., SS-SINR).

For another example, the information for configuring RedCap UE operation within the iBWP-light in a serving cell can include one or more sets of CSI-RS/TRS resources, where each CSI-RS/TRS resource from the sets of CSI-RS/TRS resources carries cell ID of the serving cell. A RedCap UE can receive the CSI-RS/TRS resources to measure RSRP (i.e., CSI-RSRP), RSRQ (i.e., CSI-RSRQ), or SINR (i.e., CSI-SINR), of the serving cell.

For yet another example, the information for configuring RedCap UE operation within the iBWP-light in a serving cell can include a configuration for RSSI measurements.

In certain embodiments, for providing OSI to RedCap UEs, one of the following two methods can be considered.

In one method, a RedCap UE receives SIB-X in a PDSCH scheduled by a DCI format provided by a PDCCH reception according to a Type0A-PDCCH CSS set in legacy initial DL BWP associated with CORESET #0. The RedCap UE may switch from iBWP-light to the legacy/primary initial DL BWP after OSI reception.

In another method, a RedCap UE receives SIB-X in a PDSCH scheduled by a DCI format provided by a PDCCH reception according to a Type0A-PDCCH CSS set in iBWP-light. The RedCap UE receives OSI excluding the configuration for RRM measurements.

Although FIG. 7 illustrates the method 700 various changes may be made to FIG. 7. For example, while the method 700 is shown as a series of steps, various steps could overlap, occur in parallel, occur in a different order, or occur multiple times. In another example, steps may be omitted or replaced by other steps. For example, steps of the method 700 can be executed in a different order.

The following embodiments of the present disclosure describe dedicated RS resources from a serving cell measurement. This is described in the following examples and embodiments, such as those of FIG. 8.

Figure 8:
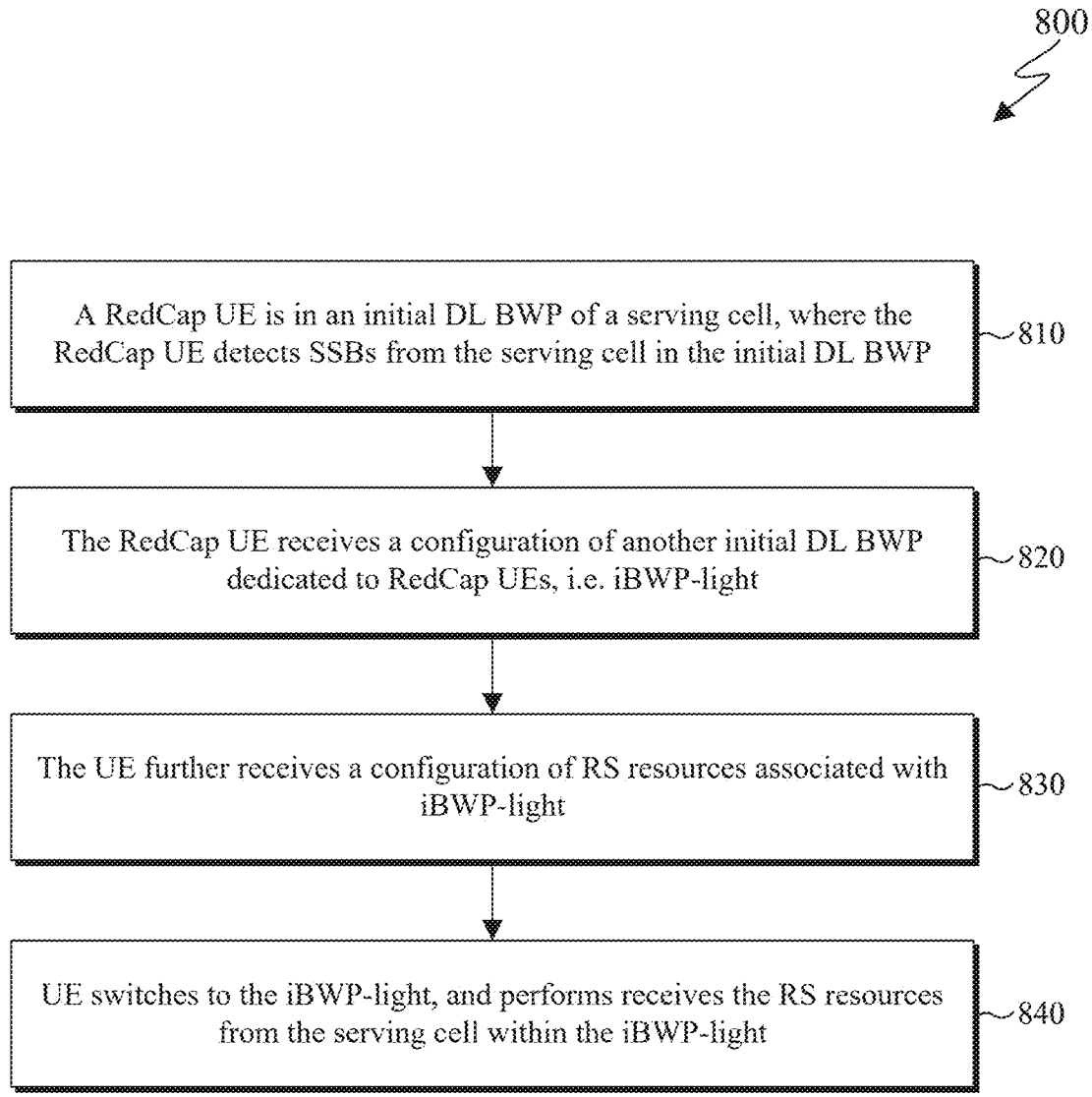
FIG. 8 illustrates an example method of a UE procedure for receiving reference signal (RS) resources dedicated to RedCap UEs according to embodiments of the present disclosure.

FIG. 8 illustrates an example method 800 of a UE procedure for receiving reference signal (RS) resources dedicated to RedCap UEs according to embodiments of the present disclosure. The steps of the method 800 of FIG. 8 can be performed by any of the UEs 111-116 of FIG. 1, such as the UE 116 of FIG. 3. The method 800 is for illustration only and other embodiments can be used without departing from the scope of the present disclosure.

Certain embodiments of the present disclosure consider supporting RS resources dedicated to RedCap UEs on a serving cell.

The method 800 as illustrated in FIG. 6 describes an example of a UE procedure for receiving RS resources dedicated to RedCap UEs.

During initial access, a RedCap UE (such as the UE 116) detects in step 810 at least one SSB and acquires information for an initial DL BWP of a serving cell based on the detected SSB. In step 820, the RedCap UE starts receiving in the initial DL BWP. The RedCap UE further receives information for another initial DL BWP, i.e., iBWP-light. The information of the iBWP-light can be included in RMSI, i.e. SIB1, of the serving cell and can be received by the RedCap UE in a PDSCH scheduled by a PDCCH from a Type0-PDCCH CSS set in the initial DL BWP. In step 830, the RedCap UE further receives information for RS resources. In step 840, the RedCap UE switches an active DL BWP from the initial DL BWP to the iBWP-light and receives the RS resources in the iBWP-light according to the information.

In certain embodiments, for receiving the information of RS resources dedicated to RedCap UEs, one of the following two methods can apply.

In one method, a serving gNB (such as the BS 102) can provide the information of RS resources dedicated to RedCap UEs together with the information of iBWP-light. For example, both information are provided by RMSI. The RMSI can be dedicated to RedCap UEs. Alternatively, the RMSI can be common to RedCap UEs and legacy UEs.

In another method, a serving gNB can provide the information of RS resources dedicated to RedCap UEs in a system information block (SIB), e.g. SIB-X, where X>1 is an integer, received by RedCap UEs in a PDSCH scheduled by a PDCCH in Type0-PDCCH CSS set associated with CORESET #0 in the initial DL BWP.

The information of RS resources dedicated to RedCap UEs can include one or more of the following: (i) one or more SSB bursts, (ii) one or more sets of CSI-RS/TRS resources, and (iii) information for RSSI measurements. A SSB from an SSB burst of SSBs provides the cell ID of the serving cell. The RedCap UEs can receive SSBs from the SSB bursts to measure RSRP (i.e. SS-RSRP), RSRQ (i.e. SS-RSRQ) or SINR (i.e. SS-SINR) of the serving cell. The information may include at least one of: (i) a physical cell ID, (ii) a frequency location of the one or more SSBs, (iii) a bitmap indicating SSBs to be measured, and (iv) a SMTC. Each CSI-RS/TRS resource from the sets of CSI-RS/TRS resources provides the cell ID of the serving cell. A RedCap UE can receive the CSI-RS/TRS resources to measure RSRP (i.e. CSI-RSRP), RSRQ (i.e. CSI-RSRQ), or SINR (i.e. CSI-SINR) of the serving cell. The information may include at least one of (i) a physical cell ID, (ii) a frequency location of the one or more sets of CSI/TRS resources, and (iii) a measurement time configuration (MTC) for CSI-RS/TRS reception, where the RedCap UE only receives CSI-RS/TRS resources within the MTC window.

In certain embodiments, a RedCap UE uses the RS resources for synchronization or automatic gain control (AGC) convergence for receptions or transmissions on the serving cell.

The information of iBWP-light can include any of the following for configuring RedCap UE operation within the iBWP-light in a serving cell.

For example, the information for configuring RedCap UE operation within the iBWP-light in a serving cell can include information of PRACH preambles or RACH occasions.

For another example, the information for configuring RedCap UE operation within the iBWP-light in a serving cell can include information for a common search space set for receiving a PDCCH providing a DCI format with CRC scrambled by RA-RNTI or TC-RNTI, wherein the DCI format can schedule a PDSCH that includes RAR (Msg2 or MsgB) or Msg4 for random access procedure.

For another example, the information for configuring RedCap UE operation within the iBWP-light in a serving cell can include information for a search space set for a PDCCH receptions that provide a DCI format scheduling a PDSCH reception for paging, wherein RedCap UE monitors PDCCH for detection of the DCI format with CRC scrambled by P-RNTI.

For another example, the information for configuring RedCap UE operation within the iBWP-light in a serving cell can include information for a physical layer signal/channel for providing PEI, such that the PEI indicates to a RedCap UE whether or not to monitor/receive PDCCH in next one or more paging occasions. In one example, the physical layer signal/channel can be a PDCCH. In another example, the physical layer signal/channel can be a RS resource, e.g., a TRS/CSI-RS resource.

For another example, the information for configuring RedCap UE operation within the iBWP-light in a serving cell can include information for one or more CORESETs.

For another example, the information for configuring RedCap UE operation within the iBWP-light in a serving cell can include a Type0A-PDCCH CSS set for PDCCH receptions providing a DCI format with CRC scrambled by a SI-RNTI.

For yet another example, the information for configuring RedCap UE operation within the iBWP-light in a serving cell can include a measurement object, e.g., MeasObjectNR in REF5, to provide information applicable for SSBs, intra/inter-frequency measurements, and/or CSI-RS intra/inter-frequency measurement. A RedCap UE performs RRM measurements for both serving cells and neighboring cells in the RRC_IDLE/INACTIVE state according to the measurement object.

In certain embodiments, for PDSCH reception with OSI by a RedCap UE, one of the following two methods can apply.

In one method, the RedCap UE receives SIB-X in a PDSCH scheduled by a DCI format provided by a PDCCH according to a Type0A-PDCCH CSS set in a legacy/primary initial DL BWP associated with CORESET #0. The RedCap UE may switch from iBWP-light to the legacy/primary initial DL BWP after PDSCH reception with OCI.

In another method, a RedCap UE receives SIB-X in a PDSCH scheduled by a DCI format provided by a PDCCH reception according to a Type0A-PDCCH CSS set in iBWP-light.

Although FIG. 8 illustrates the method 800 various changes may be made to FIG. 8. For example, while the method 800 is shown as a series of steps, various steps could overlap, occur in parallel, occur in a different order, or occur multiple times. In another example, steps may be omitted or replaced by other steps. For example, steps of the method 800 can be executed in a different order.

The following embodiments of the present disclosure describe DL BWP for a RedCap UE in the RRC_CONNECTED state.

Embodiments of the present disclosure also consider the utilization of a DL BWP for a RedCap UE in the RRC_CONNECTED state. For this embodiment, all content and examples for the initial DL BWP for a RedCap UE in RRC_IDLE/INACTIVE state from the first, second, and third embodiments of this disclosure can apply, wherein the initial DL BWP configured for RedCap UEs can be replaced by a general DL BWP configured for RedCap UEs that is referred to as BWP-light or iBWP-light.

For example, a RedCap UE does not expect to be configured with CORESET #0 or CSS set associated with CORESET #0 in the DL BWP dedicated to RedCap UEs.

For another example, a RedCap UE does not expect to be configured with Type0-PDCCH CSS set in the DL BWP dedicated to RedCap UEs.

For yet another example, a RedCap UE does not expect to be configured with SSBs for serving cell RRM measurement in the DL BWP dedicated to RedCap UEs.

It is noted that the configuration of the DL BWP configured for a RedCap UE in the RRC_CONNECTED state can be included in a set of UE-dedicated RRC parameters.

The following embodiments of the present disclosure describe restrictions of SSBs in a DL BWP for a RedCap UE.

Certain embodiments of the present disclosure consider restrictions of SSBs in a separate DL BWP configured for to a RedCap UE (e.g., iBWP-light, or BWP-light in the embodiments of this disclosure).

When a RedCap UE is indicated a separate DL BWP, the RedCap UE (such as the UE 116) can be indicated to receive SSBs in the separate DL BWP. In one example, the RedCap UE assumes the BW of the SSBs is confined within the BW of the separate DL BWP. In another example, the RedCap UE assumes the SSBs are transmitted from the serving cell.

In certain embodiments, the SSBs that a RedCap UE is indicated to receive in the separate DL BWP can be used by the RedCap UE for any of the following purposes. In one example, the SSBs are used for RRM measurements. The RRM measurements can be for the serving cell or for a neighboring cell. In another example, the SSBs are used for radio link monitoring (RLM) measurements. In another example, the SSBs are used for channel measurements and CSI reports. In yet another example, the SSBs are used for beam management (e.g., beam failure recovery or link recovery). In yet another example, the SSBs are used for AGC convergence or time/frequency tracking.

When a RedCap UE operates within the separate DL BWP than non-RedCap UEs, the RedCap UE can perform SSB based RRM measurements within the BWP and there is no impact on UE complexity.

A network/gNB has the flexibility for whether or not to transmit the additional SSBs on the separate DL BWP. The network/gNB can transmit the SSBs so that the DL BWP for a RedCap UE includes the cell-defining SSB (the SSB the RedCap UE uses to obtain the identity of the serving cell from the information provided by SIB1 for the configuration of parameters for the serving cell) and does not need to transmit additional SSBs. The network/gNB can also transmit the SSBs so that the DL BWP for the RedCap UE does not include the cell-defining SSB.

The network/gNB can indicate to a RedCap UE to perform CSI-RS based RRM measurements in the BWP-light. In that manner, the network/gNB does not need to transmit additional SSBs in the separate DL BWP (BWP-light). The network/gNB can also transmit the SSBs so that the DL BWP for RedCap UEs (BWP-light) does not include the cell-defining SSB, and the network/gNB can then transmit another set of SSB for RRM measurements within the separate DL BWP for the RedCap UE.

An assumption that a bandwidth (BW) of SSBs is confined within the DL BWP for a RedCap UE can apply to any of the following cases. In one case, the RedCap UE is operating in FR1. In another case, the RedCap UE is operating in FR2. In another case, the RedCap UE is in the RRC_IDLE/INACTIVE state. In another case, the RedCap UE is in the RRC_CONNECTED state. In another case, the RedCap UE performs an initial access procedure. In yet another case, the RedCap UE has completed the initial access procedure.

For example, the indicated SSBs in the DL BWP for a RedCap UE (BWP-light) are transmitted from the serving cell. For instance, the indication for the SSBs includes at least one of the following: (i) a physical cell ID (e.g. physCellId), (ii) a frequency location corresponding to the center of the SSBs (e.g. ssbFrequency), (iii) a transmission pattern indicating which SSBs in time domain are transmitted within the half frame (e.g. ssb-PositionsInBurst), (iv) a periodicity of the SSBs in the serving cell (e.g. ssb-periodicityServingCell), (v) a subcarrier spacing of the SSBs (e.g. ssbSubcarrierSpacing), (vi) an average transmission power (e.g. energy per resource element (EPRE)) of the SSBs (measured by the REs of a secondary synchronization signal (SSS)—e.g. ss-PBCH-BlockPower).

For another example, SSBs in the DL BWP for a RedCap UE are non-cell-defining SSBs e.g., there is no RMSI associated with the SSBs. Information for RMSI absence can also be indicated by the PBCH payload of the SSB.

For another example, the SSBs in the DL BWP for a RedCap UE can be different from the set of SSBs used for initial access procedure (e.g., latest cell search procedure, for instance, also referred to as cell-defining SSBs) by the RedCap UE. For this example, there can be a relationship/ correspondence between the SSBs in the DL BWP for the RedCap UE and the set of SSBs used for initial access procedure by the RedCap UE.

In one sub-example, the physical cell ID for the SSBs in the DL BWP for a RedCap UE can be same as the physical cell ID corresponding to the SSBs used for initial access procedure by the RedCap UE. For instance, there is no explicit configuration of the physical cell ID for the SSBs in the DL BWP for the RedCap UE and the physical cell ID from the SSBs for the initial access procedure by the RedCap UE is reused.

In another sub-example, a transmission pattern indicating SSBs in time domain that are transmitted within the half frame (e.g., ssb-PositionsInBurst) in the DL BWP for a RedCap UE can be the identical to the transmission pattern of SSBs used for initial access procedure by the RedCap UE. For instance, there is no explicit information for a configuration of the transmission pattern for the SSBs in the DL BWP for the RedCap UE and the transmission pattern from the SSBs for initial access procedure is reused by the RedCap UE.

In another sub-example, a transmission pattern indicating SSBs in time domain that are transmitted within the half frame (e.g., ssb-PositionsInBurst) in the DL BWP for a RedCap UE can be a subset of the transmission pattern of SSBs used for initial access procedure by the RedCap UE. For instance, if a bit has value one in the bitmap (e.g., ssb-PositionsInBurst) for indicating the transmission pattern of SSBs in the DL BWP for the RedCap UE, the RedCap UE can assume the corresponding bit also has value of one in the bitmap (e.g., ssb-PositionsInBurst) for indicating the transmission pattern of SSBs used for initial access procedure by the RedCap UE.

In yet another sub-example, a periodicity of SSBs in the DL BWP for a RedCap UE (e.g., ssb-periodicityServingCell) can be same as a periodicity of SSBs used for initial access procedure by the RedCap UE. For instance, there is no explicit configuration of the periodicity of the SSBs in the DL BWP for the RedCap UE and the periodicity of the SSBs for initial access procedure is reused by the RedCap UE.

In another sub-example, a periodicity of the SSBs in the DL BWP for a RedCap UE (e.g., ssb-periodicityServingCell) can be same as or larger than a periodicity of SSBs used for initial access procedure by the RedCap UE.

In another sub-example, a subcarrier spacing of SSBs in the DL BWP for a RedCap UE (e.g., ssb-periodicityServingCell) can be same as a subcarrier spacing of SSBs used for initial access procedure by the RedCap UE. For instance, there is no explicit indication of the subcarrier spacing of the SSBs in the DL BWP for the RedCap UE and the subcarrier spacing of the SSBs for initial access procedure is reused by the RedCap UE.

In another sub-example, an average transmission power of SSBs in the DL BWP for a RedCap UE (e.g., ss-PBCH-BlockPower) can be same as an average transmission power of SSBs used for initial access procedure by the RedCap UE. For instance, there is no explicit indication of the average transmission power of the SSBs in the DL BWP for the RedCap UE and the average transmission power of the SSBs for initial access procedure is reused by the RedCap UE.

In another sub-example, a RedCap UE can assume a SSB in the DL BWP for RedCap UEs is quasi co-located (QCLed) with a SSB used for initial access procedure by the RedCap UE if the SSB index (or candidate SSB index) of the two SSB is same.

In yet another sub-example, a RedCap UE can assume SSBs in the DL BWP for a RedCap UE are transmitted in the same half frame as SSBs used for initial access procedure by the RedCap UE. For instance, a corresponding indicated system frame number (SFN) and/or half frame indication in PBCH payload/MIB is same for both SSBs.

For example, an assumption that a BW of SSBs is confined within a BW of a DL BWP for a RedCap UE can apply if at least one of the following conditions holds. In one condition, the RedCap UE is indicated to monitor PDCCH according to a Type0-PDCCH CSS set in the DL BWP for RedCap UEs. In another condition, the RedCap UE is indicated to monitor PDCCH according to a Type0A-PDCCH CSS set in the DL BWP for RedCap UEs. In another condition, the RedCap UE is indicated to monitor PDCCH according to a Type1-PDCCH CSS set in the DL BWP for RedCap UEs. In another condition, the RedCap UE is indicated to monitor PDCCH according to a Type2-PDCCH CSS set in the DL BWP for RedCap UEs. In yet another condition, the RedCap UE is indicated RACH occasions (ROs) in the UL BWP for RedCap UEs.

In one sub-example, if a RedCap UE is indicated to monitor PDCCH according to a Type0-PDCCH CSS set in the DL BWP for RedCap UEs, the RedCap UE can assume that a demodulation reference signal (DM-RS) of a PDCCH reception is QCLed with the SSB used in the initial access procedure by the RedCap.

In another sub-example, if a RedCap UE is indicated to monitor PDCCH according to a Type0A-PDCCH CSS set in the DL BWP for RedCap UEs (BWP-light), the RedCap UE can assume that a DM-RS of a PDCCH reception is QCLed with the SSB used in the initial access procedure by the RedCap UE.

In another sub-example, if a RedCap UE is indicated to monitor PDCCH according to a Type1-PDCCH CSS set in the DL BWP for RedCap UEs, the RedCap UE can assume that a DM-RS of a PDCCH reception is QCLed with the SSB used in the initial access procedure by the RedCap UE.

In yet another sub-example, if a RedCap UE is indicated to monitor PDCCH according to a Type2-PDCCH CSS set in the DL BWP for RedCap UEs, the RedCap UE can assume that a DM-RS of a PDCCH reception is QCLed with the SSB used in the initial access procedure by the RedCap UE.

In one sub-example, if a RedCap UE is configured to monitor PDCCH according to a Type0-PDCCH CSS set in the DL BWP for RedCap UEs, the RedCap UE can assume that a DM-RS of a PDCCH reception is QCLed with the SSB used in the latest cell search procedure by the RedCap UE.

In another sub-example, if a RedCap UE is indicated to monitor PDCCH according to a Type0A-PDCCH CSS set in the DL BWP for RedCap UEs, the RedCap UE can assume that a DM-RS of a PDCCH reception is QCLed with the SSB used in the latest cell search procedure by the RedCap UE.

In another sub-example, if a RedCap UE is indicated to monitor PDCCH according to a Type1-PDCCH CSS set in the DL BWP for RedCap UEs, the RedCap UE can assume that a DM-RS of a PDCCH reception is QCLed with the SSB used in the latest cell search procedure by the RedCap UE.

In yet another sub-example, if a RedCap UE is indicated to monitor PDCCH according to a Type2-PDCCH CSS set in the DL BWP for RedCap UEs, the RedCap UE can assume that a DM-RS of the Type2-PDCCH is QCLed with the SSB used in the latest cell search procedure by the RedCap UE.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a user equipment (UE) with reduced capabilities (RedCap) in a wireless communication system, the method comprising:
   receiving, from a base station, a first synchronization signal and physical broadcast channel (SS/PBCH) block which includes system information comprising configuration information for a first initial downlink (DL) bandwidth part (BWP);
   receiving, from the base station, a system information block 1 (SIB1) based on the configuration information;
   identifying a second initial DL BWP for the UE with RedCap based on the SIB1; and
   receiving, from the base station, a physical downlink control channel (PDCCH) in the second initial DL BWP,
   wherein, in case that the PDCCH is monitored according to a Type1-PDCCH common search space (CSS) set of the second initial DL BWP, the second initial DL BWP does not include SS/PBCH blocks.

2. The method of claim 1, further comprising:
   receiving, from the base station, first information configuring a DL BWP for the UE with RedCap; and
   receiving, from the base station, a second SS/PBCH block in the DL BWP,
   wherein the second SS/PBCH block is a non-cell-defining (NCD) SS/PBCH block, and
   wherein the first SS/PBCH block and the second SS/PBCH block with a same index have same quasi co-location (QCL) properties.

3. The method of claim 2, further comprising:
   receiving, from the base station, second information configuring the second SS/PBCH block,
   wherein the second information includes a frequency of the second SS/PBCH block and a periodicity of the second SS/PBCH block, and
   wherein the periodicity of the second SS/PBCH block is larger than a periodicity of the first SS/PBCH block.

4. The method of claim 2,
   wherein the first SS/PBCH block and the second SS/PBCH block have a same value for at least one property, the at least one property including positions in burst of a SS/PBCH block, a physical cell identifier (PCI) of the SS/PBCH block, and a block power for the SS/PBCH block.

5. A user equipment (UE) with reduced capabilities (RedCap) in a wireless communication system, the UE with RedCap comprising:
   a transceiver; and
   a controller coupled with the transceiver, and configured to:
     receive, from a base station, a first synchronization signal and physical broadcast channel (SS/PBCH) block which includes system information comprising configuration information for a first initial downlink (DL) bandwidth part (BWP),
     receive, from the base station, a system information block 1 (SIB1) based on the configuration information,
     identify whether a second initial DL BWP for the UE with RedCap based on the SIB1, and
     receive, from the base station, a physical downlink control channel (PDCCH) in the second initial DL BWP, and
   wherein, in case that the PDCCH is monitored according to a Type1-PDCCH common search space (CSS) set of the second initial DL BWP, the second initial DL BWP does not include SS/PBCH blocks.

6. The UE of claim 5, wherein the controller is further configured to:
   receive, from the base station, first information configuring a DL BWP for the UE with RedCap, and
   receive, from the base station, a second SS/PBCH block in the DL BWP,
   wherein the second SS/PBCH block is a non-cell-defining (NCD) SS/PBCH block, and
   wherein the first SS/PBCH block and the second SS/PBCH block with a same index have same quasi co-location (QCL) properties.

7. The UE of claim 6, wherein the controller is further configured to:
   receive, from the base station, second information configuring the second SS/PBCH block,
   wherein the second information includes a frequency of the second SS/PBCH block and a periodicity of the second SS/PBCH block, and
   wherein the periodicity of the second SS/PBCH block is larger than a periodicity of the first SS/PBCH block.

8. The UE of claim 6,
   wherein the first SS/PBCH block and the second SS/PBCH block have a same value for at least one property, the at least one property including positions in burst of a SS/PBCH block, a physical cell identifier (PCI) of the SS/PBCH block, and a block power for the SS/PBCH block.

9. A base station in a wireless communication system, the base station comprising:
   a transceiver; and
   a controller coupled to the transceiver, and configured to:
     transmit, to a user equipment (UE) with reduced capabilities (RedCap), a first synchronization signal and physical broadcast channel (SS/PBCH) block which includes system information comprising configuration information for a first initial downlink (DL) bandwidth part (BWP),
transmit, to the UE with RedCap, a system information block 1 (SIB1) based on the configuration information, and
transmit, to the UE with RedCap, a physical downlink control channel (PDCCH) in a second initial DL BWP, the second initial DL BWP being based on the SIB1 of the first initial DL BWP,
wherein, in case that the PDCCH is monitored according to a Type1-PDCCH common search space (CSS) set of the second initial DL BWP, the second initial DL BWP does not include SS/PBCH blocks.

10. The base station of claim 9, wherein the controller is further configured to:
transmit, to the UE with RedCap, first information configuring a DL BWP for the RedCap, and
transmit, to the UE with RedCap, a second SS/PBCH block in the DL BWP,
wherein the second SS/PBCH block is a non-cell-defining (NCD) SS/PBCH block, and
wherein the first SS/PBCH block and the second SS/PBCH block with a same index have same quasi co-location (QCL) properties.

11. The base station of claim 10, wherein the controller is further configured to:
transmit, to the UE with RedCap, second information configuring the second SS/PBCH block,
wherein the second information includes a frequency of the second SS/PBCH block and a periodicity of the second SS/PBCH block, and
wherein the periodicity of the second SS/PBCH block is larger than a periodicity of the first SS/PBCH block.

12. A method performed by a base station in a wireless communication system, the method comprising:
transmitting, to a user equipment (UE) with reduced capabilities (RedCap), a first synchronization signal and physical broadcast channel (SS/PBCH) block which includes system information comprising configuration information for a first initial downlink (DL) bandwidth part (BWP);
transmitting, to the UE with RedCap, a system information block 1 (SIB1) based on the configuration information; and
transmitting, to the UE with RedCap, a physical downlink control channel (PDCCH) in a second initial DL BWP, the second BWP being based on the SIB1 of the first BWP,
wherein, in case that the PDCCH is monitored according to a Type1-PDCCH common search space (CSS) set of the second initial DL BWP, the second initial DL BWP does not include SS/PBCH blocks.

13. The method of claim 12, further comprising:
transmitting, to the UE with RedCap, first information configuring a DL BWP for the RedCap; and
transmitting, to the UE with RedCap, a second SS/PBCH block in the DL BWP,
wherein the second SS/PBCH block is a non-cell-defining (NCD) SS/PBCH block, and
wherein the first SS/PBCH block and the second SS/PBCH block with a same index have same quasi co-location (QCL) properties.

14. The method of claim 13, further comprising:
transmitting, to the UE with RedCap, second information configuring the second SS/PBCH block,
wherein the second information includes a frequency of the second SS/PBCH block and a periodicity of the second SS/PBCH block, and
wherein the periodicity of the second SS/PBCH block is larger than a periodicity of the first SS/PBCH block.

15. The method of claim 13, wherein the first SS/PBCH block and the second SS/PBCH block have a same value for at least one property, the at least one property including positions in burst of a SS/PBCH block, a physical cell identifier (PCI) of the SS/PBCH block, and a block power for the SS/PBCH block.

* * * * *